United States Patent
Taylor et al.

(10) Patent No.: US 9,153,380 B2
(45) Date of Patent: Oct. 6, 2015

(54) SHAPEABLE SHORT CIRCUIT RESISTANT CAPACITOR

(71) Applicant: DELPHI TECHNOLOGIES, INC., Troy, MI (US)

(72) Inventors: Ralph S. Taylor, Noblesville, IN (US); John D. Myers, Kokomo, IN (US); William J. Baney, Roanoke, VA (US)

(73) Assignee: Delphi Technologies, Inc., Troy, MI (US)

( * ) Notice: Subject to any disclaimer, the term of this patent is extended or adjusted under 35 U.S.C. 154(b) by 356 days.

(21) Appl. No.: 13/752,441

(22) Filed: Jan. 29, 2013

(65) Prior Publication Data

US 2013/0148255 A1     Jun. 13, 2013

Related U.S. Application Data

(62) Division of application No. 12/498,025, filed on Jul. 6, 2009, now Pat. No. 8,407,871.

(51) Int. Cl.
| | |
|---|---|
| *H01G 4/06* | (2006.01) |
| *H01G 4/32* | (2006.01) |
| *H01G 2/18* | (2006.01) |
| *H01G 4/015* | (2006.01) |
| *H01G 4/30* | (2006.01) |
| *H01G 13/00* | (2013.01) |
| *H01G 4/12* | (2006.01) |

(52) U.S. Cl.
CPC ............... *H01G 2/18* (2013.01); *H01G 4/015* (2013.01); *H01G 4/308* (2013.01); *H01G 13/00* (2013.01); *H01G 4/1218* (2013.01); *Y02T 10/7022* (2013.01); *Y10T 29/43* (2015.01); *Y10T 29/435* (2015.01); *Y10T 29/49124* (2015.01); *Y10T 29/49155* (2015.01); *Y10T 156/1168* (2015.01)

(58) Field of Classification Search
USPC ..................... 361/301.4, 311, 303, 301.5
See application file for complete search history.

(56) References Cited

U.S. PATENT DOCUMENTS

| | | | |
|---|---|---|---|
| 3,894,872 A | 7/1975 | Mitchell et al. | |
| 4,058,445 A | 11/1977 | Anders | |
| 4,146,914 A * | 3/1979 | Rayburn | 361/304 |
| 5,032,461 A | 7/1991 | Shaw et al. | |
| 6,212,057 B1 * | 4/2001 | Kohara et al. | 361/301.4 |
| 6,414,377 B1 | 7/2002 | Cohen et al. | |
| 6,849,517 B2 * | 2/2005 | Chung et al. | 438/396 |
| 7,099,141 B1 | 8/2006 | Kaufman et al. | |
| 7,193,311 B2 | 3/2007 | Ogawa et al. | |
| 7,367,119 B2 | 5/2008 | Belov | |
| 2007/0202257 A1 | 8/2007 | Sakurai | |

FOREIGN PATENT DOCUMENTS

| | | |
|---|---|---|
| GB | 1030820 A | 5/1966 |
| WO | 2010028492 A1 | 3/2010 |

* cited by examiner

*Primary Examiner* — Eric Thomas
(74) *Attorney, Agent, or Firm* — Lawrence D. Hazelton

(57) ABSTRACT

A ceramic short circuit resistant capacitor that is bendable and/or shapeable to provide a multiple layer capacitor that is extremely compact and amenable to desirable geometries. The capacitor that exhibits a benign failure mode in which a multitude of discrete failure events result in a gradual loss of capacitance. Each event is a localized event in which localized heating causes an adjacent portion of one or both of the electrodes to vaporize, physically cleaning away electrode material from the failure site. A first metal electrode, a second metal electrode, and a ceramic dielectric layer between the electrodes are thin enough to be formed in a serpentine-arrangement with gaps between the first electrode and the second electrode that allow venting of vaporized electrode material in the event of a benign failure.

7 Claims, 4 Drawing Sheets

SHAPEABLE SHORT CIRCUIT RESISTANT CAPACITOR

CROSS-REFERENCE TO RELATED APPLICATION

This application is a divisional application and claims the benefit under 35 U.S.C. §121 of U.S. patent application Ser. No. 12/498,025 filed Jul. 6, 2009.

STATEMENT REGARDING FEDERALLY SPONSORED RESEARCH OR DEVELOPMENT

The subject invention was made under a CRADA Number 0700801 between Delphi Automotive Systems LLC and UChicago Argonne, LLC, as operator of Argonne National Laboratory for the United States Department of Energy. The United States government has certain rights in this invention.

FIELD OF THE INVENTION

This invention relates to electrical capacitors, and more particularly to capacitors exhibiting a benign failure mode in which failure occurs gradually due to a multitude of discrete failure events rather than a single catastrophic failure event.

BACKGROUND OF THE INVENTION

Known capacitors having a high capacitance ceramic dielectric layer and exhibiting a benign failure mode have a relatively thick base electrode that limits shapeability. Specifically, the base electrode is sufficiently thick to effectively prevent bending of the capacitor to form multiple layer capacitor structures. Such multiple layer structures and other shaped arrangements may be desired to conform the shape of the capacitor to available space of a device and/or to provide a more compact capacitor structure.

Known capacitors exhibiting a benign failure mode are prepared by polishing a metal foil electrode (typically nickel or copper foil) to a surface roughness of 3 to 5 nanometers (root mean square roughness over a one micrometer square area). Polishing is needed because the metal foils used for preparing capacitors having a high capacitance ceramic dielectric layer and exhibiting a benign failure mode cannot be manufactured without a sufficiently smooth surface. The smoother the finish the thinner the dielectric. The thinner the dielectric layer the higher the capacitance value. This surface is needed to form a uniformly thin dielectric layer between electrode layers. However, in order to facilitate handling of the foil in a polishing operation, the foil must be of a thickness that renders the completed capacitor incapable of being shaped or bent without becoming damaged. Thus, there has not been any method of providing a highly shapeable or bendable capacitor having a high capacitance ceramic dielectric layer and exhibiting a benign failure mode.

SUMMARY OF THE INVENTION

In one aspect of the invention, there is provided an improved method of making a capacitor having a high capacitance ceramic dielectric layer and exhibiting a benign failure mode. The improved method allows thinner and more flexible capacitors of this type to be made. These thinner, more flexible capacitors can be bent and/or shaped to form multiple layer capacitor structures that can conform to a desired geometry and/or facilitate more compact capacitor structures. The method involves forming a first thin metal layer on a substrate, and if needed a buffer layer onto the metal layer to prevent diffusion and oxidation while providing planarization. The method further includes depositing a thin, ceramic dielectric layer over the buffer layer; depositing a second thin metal layer over the dielectric layer to form a capacitor exhibiting a benign failure mode; and separating the capacitor from the substrate. The substrate provides rigidity needed during processing, thereby allowing a very thin first metal layer that can become part of a capacitor that is easily bent and which exhibits a benign failure mode.

In another aspect, the invention provides a shapeable, short-resistant capacitor that comprises a thin ceramic dielectric material disposed between metal electrode layers, wherein the dielectric layer and each of the electrode layers are sufficiently thin to allow bending and shaping of the capacitor.

In another aspect, the invention provides a shaped film or foil capacitor exhibiting a benign failure mode and having a plurality of overlapping layers.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1A:
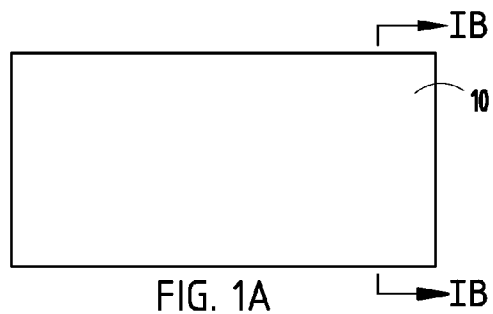
FIG. 1A shows a top view of a silicon substrate used as a carrier for making a short-resistant capacitor in accordance with the invention.

The invention utilizes a novel combination of conventional fabrication techniques employed in the fabrication of integrated circuit devices and/or other nanoscopically scaled devices, such as oxidation, metalization, polishing and patterning to provide a ceramic short-resistant capacitor that is bendable and/or shapeable to provide multiple layer capacitors that are extremely compact and amenable to desirable geometries. For any given voltage potential across the electrodes of a capacitor, the capacitance (i.e., the ability to store a charge or electrical energy) is proportional to the dielectric constant of the dielectric material between the electrodes and the area of overlap between the electrodes, and inversely proportional to the distance between the electrodes.

Ceramic dielectrics, particularly ferroelectric materials, have a dielectric constant that is typically several orders of magnitude greater than the dielectric constant for polymeric materials or air. The short-resistant capacitors of the invention employ very thin ceramic dielectric materials, and, therefore, have a very high capacitance per unit area. In addition, because at least one of the electrodes is extremely thin, the capacitors of the invention are not subject to catastrophic failure, but instead exhibit what has been termed "graceful failure," wherein there is a gradual loss of capacitance over time. Because of the high capacity and graceful or benign failure characteristics of the capacitors, they are excellent candidates for use in various applications requiring a high energy density and high reliability, such as for space hardware, battlefield equipment, hybrid vehicles, and various other industrial and communications applications. However, in addition to the foregoing attributes, the capacitors of the invention have the further advantage of being shapeable or bendable, even around a relatively tight radius of curvature, thereby permitting overlapping relationships (i.e., multiple layer capacitors) that do not require leads between layers. This permits the capacitors of the invention to be shaped into any of various compact configurations more easily and at a substantially reduced cost.

As used herein, the term "shapeable" refers to a capacitor in which the electrode layers and dielectric layer between the electrode layers are sufficiently thin and malleable to allow bending of the capacitor by 180 degrees around a radius of curvature that is about 2 millimeters or less, without failure of the capacitor. Known short-resistant capacitors comprising a ceramic dielectric material disposed between electrode layers have required a relatively thick base electrode layer upon which the ceramic layer is deposited. The relatively thick base electrode layer (typically on the order of about 0.5 millimeters or 500 micrometers) rendered the completed capacitor substantially unshapeable or unbendable. The relatively thick base electrode was required to permit handling and mounting of the base electrode during a polishing operation. Polishing was necessary in order to provide a surface roughness in the range of from about 3 to about 5 nanometers (root means square over a one micrometer square area). A smooth surface is necessary to allow depositing of a uniformly thin ceramic layer that provides the desired high capacitance in combination with a benign failure mode.

The term "short-resistant" refers to a capacitor that exhibits a benign failure mode, also known as graceful failure, in which a multitude of discrete failure events result in a gradual loss of capacitance. In many cases, the number of discrete failure events that must occur before an appreciable loss of capacitance is experienced may be on the order of hundreds or even thousands of events. In such case, each event is a localized event (on the order of about 20 microns in diameter) in which localized heating causes an adjacent portion of one or both of the electrodes to become vaporized, thereby physically cleaning away electrode material from the defect site. In this mode of failure, shorts do not typically occur as a result of a defect failure. Rather, there is a gradual loss of capacitance and failure is delayed until a predetermined or defined leakage current or dielectric loss is reached. A known ceramic capacitor exhibiting graceful failure by self-clearing is described in U.S. Pat. No. 7,099,141, which is hereby incorporated by reference.

The term "rigid substrate" refers to a substrate onto which a very thin metal film may be deposited and which exhibits sufficient rigidity to facilitate processing of the thin metal layer deposited on the substrate to the desired surface roughness of 3 to 5 nanometers (root means square over a one micrometer square area).

Suitable rigid substrates that act as carriers during assembly of the shapeable, short-resistant capacitors of the invention include silicon, quartz and ceramic substrates. Other rigid substrate materials may be possible. The thickness of the rigid substrate is not critical, and need only be sufficiently thick to provide a rigidity necessary for subsequent processing, which rigidity would otherwise be provided by a thicker base electrode. There is not any upper limit on the thickness of the rigid substrate. Suitable thicknesses for the rigid substrate, when it is silicon, quartz or ceramic, can include thicknesses ranging from hundreds of micrometers to several millimeters.

In order to promote adhesion of a subsequently deposited metal layer, the rigid substrate 10 can be subjected to a surface oxidation treatment to form an adhesion promoting layer 11. This should not be necessary for a quartz substrate, but may be desirable for a silicon substrate. In addition to promoting adhesion of a first metal layer 12 to the rigid substrate 10, layer 11 can also act as an electrical insulator, electrically isolating the subsequently deposited metal layer from the bulk or major portion of the substrate. Processes for depositing an oxide layer 11 or forming an oxide layer on a substrate are well known in the art, and do not, of themselves, constitute a novel feature of the invention. For example, a silicon oxide layer may be formed on a silicon substrate by contacting the substrate with ozone and tetraethylorthosilicate (TEOS) gases and reacting ozone and TEOS in contact with the substrate to deposit silicon oxide onto the substrate.

As will be subsequently discussed in greater detail, adhesion promoting layer 11 may be a degradable material or a material that is weakly bonded to the metal layer 12 and/or substrate 10, such as an oxide layer grown on substrate 10, facilitating easy release and separation of first metal layer 12 from substrate 10.

Figure 1B:
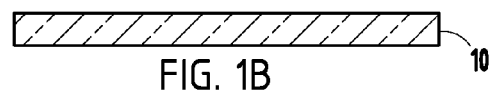
FIG. 1B is an elevational cross-sectional view as seen along lines 1B of FIG. 1A.
Figure 2A:
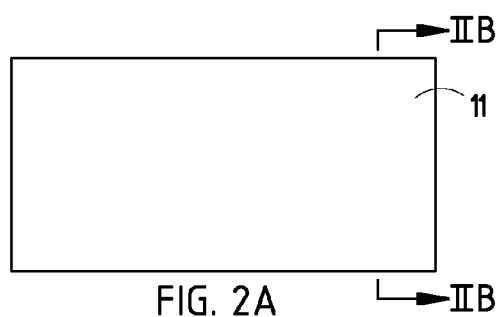
FIG. 2A is a top view of the silicon substrate of FIG. 1A after an oxide layer has been formed.
Figure 2B:
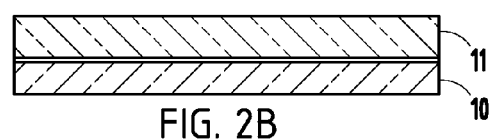
FIG. 2B is a cross-sectional view of the silicon substrate with oxide layer of FIG. 2A as viewed along lines 2B-2B.
Figure 3A:
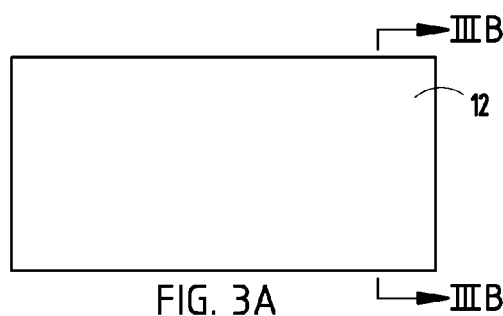
FIG. 3A is a top view of the silicon substrate with oxide layer as shown in FIG. 2A after application of a first metal layer (multiple metal layers may be desirable for adhesion and current carrying capability).
Figure 3B:
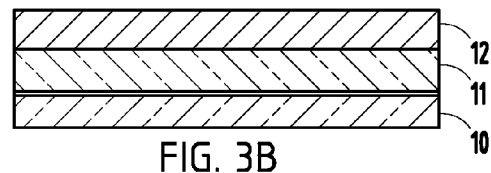
FIG. 3B is cross-sectional view of the silicon substrate oxide layer and metal layer of FIG. 3A as viewed along lines 3B-3B of FIG. 3A.

Assembly of a shapeable, short-resistant capacitor in accordance with the invention may begin by providing a substrate 10 (FIGS. 1A and 1B), a first metal layer 12 (FIGS. 3A and 3B) on the substrate or on an oxide layer 11 formed at the surface of the substrate (FIGS. 2A and 2B). This first metal layer 12 may be comprised of generally any relatively inert electrically conductive metal that can be deposited on the rigid substrate or on an oxide layer formed at the surface of the rigid substrate. Examples of suitable metals for the first metal layer include, but are not limited to, nickel, aluminium, copper, zinc, silver, gold, platinum, titanium, chrome or tungsten. Multiple layers may be required to promote adhesion. However, other metals may be used. The first metal layer 12 can be deposited on the rigid substrate 10 (or on an oxide layer formed at the surface of the rigid substrate) by any technique which provides a layer of substantially uniform thickness. Examples of suitable metal deposition techniques include, but are not limited to, sputtering, thermal evaporation, electron beam evaporation, physical vapour deposition, chemical vapour deposition, etc. Because the rigid substrate 10 provides the necessary strength and rigidity needed for subsequent processing, the first metal layer 12 need not be sufficiently thick to impart the required rigidity, but may instead be extremely thin as compared with the base layer of a conventional short-resistant capacitor. Desirably, the first metal layer 12 is sufficiently thin to allow bending and shaping and thick enough to carry the current required as previously described. Desirably, the first metal layer 12 has a thickness less than 500 micrometers, more desirably less than 100 micrometers, and even more desirably less than 10 micrometers, with thicknesses on the order of one micrometer or even 0.1 micrometer providing desirable results.

While deposition techniques may provide a sufficiently smooth surface that meets the criteria for a surface roughness of less than 5 nanometers (root means square over a one micrometer square area), the surface of the first metal layer 12 may undergo a conventional polishing process to achieve the desired surface roughness of less than 5 nanometers (root means square over a one micrometer square area).

Figure 4A:
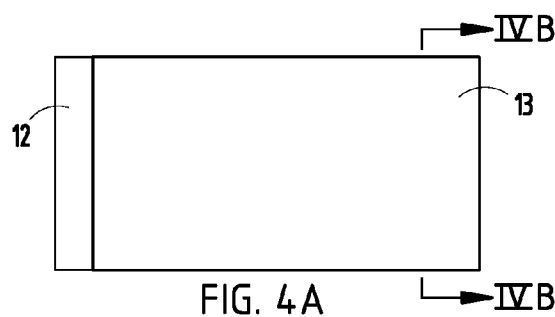
FIG. 4A is a top view of the assembled layers of FIG. 3A after application of a buffer layer.
Figure 4B:
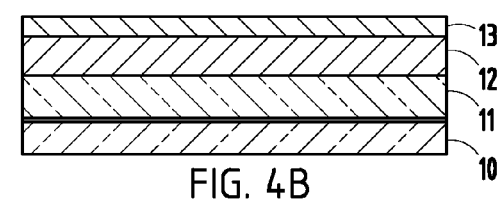
FIG. 4B is a cross-sectional view of the assembled layers shown in FIG. 4A.
Figure 5A:
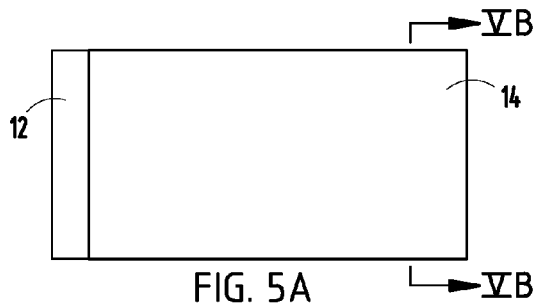
FIG. 5A is a top view of the assembled arrangement of FIG. 4A after further application of a ceramic layer.
Figure 5B:
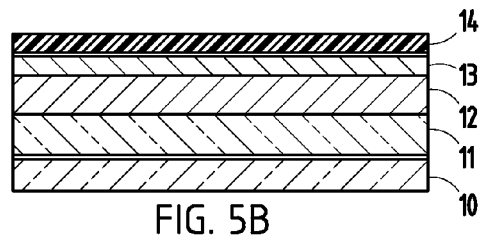
FIG. 5B is a cross-sectional view of the assembled layer shown in FIG. 5A.
Figure 6A:
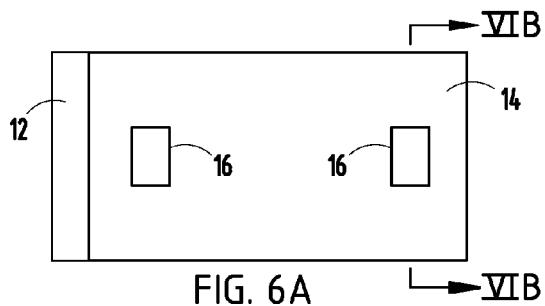
FIG. 6A is a top view of the assembly of FIG. 5A after application of a patterned oxide layer.
Figure 6B:
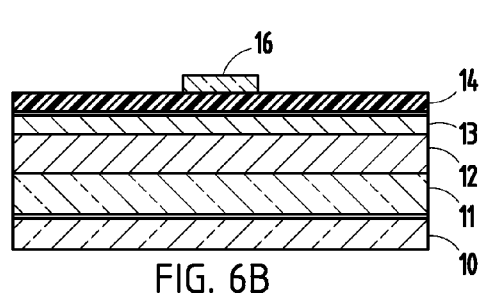
FIG. 6B is a cross-sectional view of the assembly shown in FIG. 6A.

Deposited on the first metal layer 12 is a ceramic layer 14 (FIGS. 5A and 5B), such as a lead lanthanum zirconium titanate (PLZT) ceramic. Also, combinations of different ceramic materials may be used. Additionally, rather than directly depositing a ceramic such as PLZT on the first metal layer 12, a buffer layer 13 may be first applied to promote adhesion and prevent diffusion between the first metal layer 12 and the PLZT or other ceramic layer 14 (FIGS. 4A and 4B). Use of a buffer layer 13 prevents delamination and/or oxidation of first metal layer 12, and may perform a planarizing function. An example of a suitable buffer layer is a lanthanum nickel oxide (LNO) film, which may be applied to a thickness of, for example, from about 0.2 to about 0.3 micrometers. Another example of a suitable buffer layer that promotes adhesion between the ceramic layer 14 and the first metal layer 12 is an organic solderability preservative (OSP) coating. Buffer layer 13 is optional depending on the previous metal layer(s). Buffer layer 13 requires a heat cycle up to 700° C. to pyrolyze. A suitable thickness for the ceramic layer 14 (e.g., PLZT layer) is from about 0.5 to about 3 micrometers depending on breakdown voltage requirements. This provides a suitable and desirable combination of flexibility, high capacitance, and a benign failure mode. However, slightly thinner and thicker ceramic layers can also provide adequate results. For example, thicknesses in the range of from about 0.1 to about 4 micrometers are expected to provide desirable results. Ceramic layer 14 may require a heat cycle up to about 700° C. to anneal. On selected areas of the surface of the ceramic layer 14, additional electrically insulative material 16 (FIGS. 6A and 6B), can be applied to facilitate attachment of electrical leads to a subsequently applied second metal layer (electrode). By providing additional electrical insulation 16 at those areas of the capacitor where electrical leads are to be attached, it becomes possible to connect electrical leads to the completed capacitor without compromising the benign failure mode characteristic and without compromising short resistance. The additional electrically insulative material 16 at the lead attachment area prevents electrical arcing across the electrodes at the lead attachment area, thereby eliminating the possibility of a defect failure in the area of the electrical lead connection. A failure at a lead connection area would result in a short circuit and catastrophic failure of the capacitor since the lead connection would prevent vaporization and self-clearing of electrode material at the lead connection. Suitable techniques for patterning an insulative oxide layer 16 or spin-on glass (SOG) layer are well known in the art and do not, by themselves, constitute the invention.

Figure 7A:
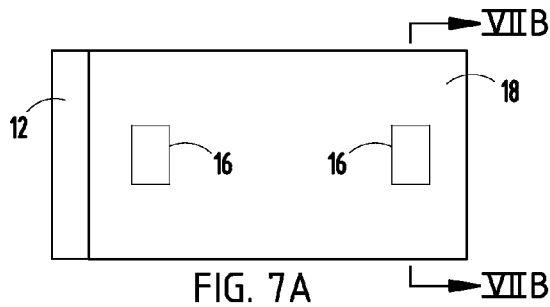
FIG. 7A is a top view of the assembly shown in FIG. 6A after application of a second electrode layer.
Figure 7B:
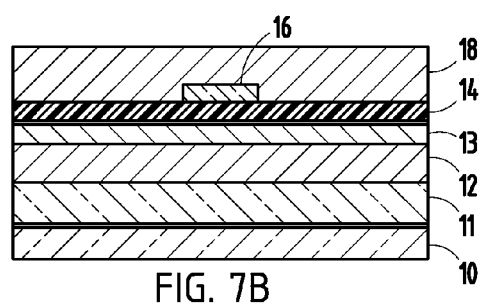
FIG. 7B is a cross-sectional view of the assembly shown in FIG. 7A.

A second metal layer 18 (FIGS. 7A and 7B) is deposited on the ceramic layer 14 and over any patterned insulative material 16 deposited on the ceramic layer 14 to facilitate connection of electrical leads (FIGS. 4A and 4B). The first 12 and second 16 metal layers separated by the ceramic layer 14 define a capacitor having a high capacitance per unit area. The second metal film 18 is preferably deposited to a thickness in the range of from about 0.01 to about 1 micrometer (i.e., about 10 nanometers to about 1,000 nanometers). Such an extremely thin second electrode allows complete evaporation or self-clearing of a very small area of the electrode in the event of a failure, whereby the capacitance of the entire capacitor is only very slightly reduced. As a result, numerous (e.g., hundreds or thousands) of discrete failure events may occur before the capacitor is unable to perform satisfactorily.

Deposition of the second metal layer 18 may be accomplished by any means which provides layers of uniform thicknesses, and generally includes any of the techniques that may be used for depositing the first metal layer on the substrate, including sputtering, thermal evaporation, electron beam evaporation, chemical vapour deposition, and physical vapour deposition. The second metal layer 18 may be comprised of generally any metal that can be deposited on the ceramic layer, which is substantially inert, highly electrically conductive, and has a sufficiently low vaporization temperature. Examples of suitable metals include aluminum, platinum, copper, zinc, silver, gold, and combinations thereof. For example, a suitable second metal layer 18 may be deposited using electron beam evaporation technique to deposit aluminum to a thickness of about 0.2 to 0.3 micrometers.

Figure 8A:
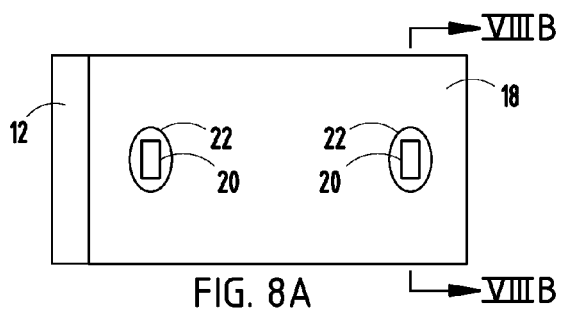
FIG. 8A is a top view of the assembly shown in FIG. 7A after attachment of an electrical lead.
Figure 8B:
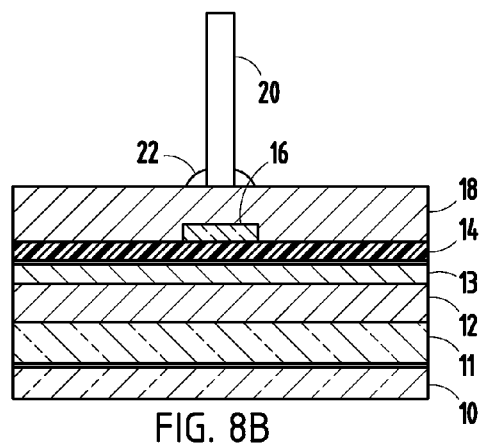
FIG. 8B is a cross-sectional view of the assembly shown in FIG. 8A.

Electrical leads 20 may be attached with solder 22 as shown in FIG. 8B or any other method known in the art.

Following assembly of the capacitor layers as described above, the next step in the fabrication process involves separating the layers of the capacitor from the substrate. This can be achieved by peeling a weak bond between the Si and the first metal layer or by backgrinding and chemically etching the Si substrate to the desired thickness.

Figure 9:
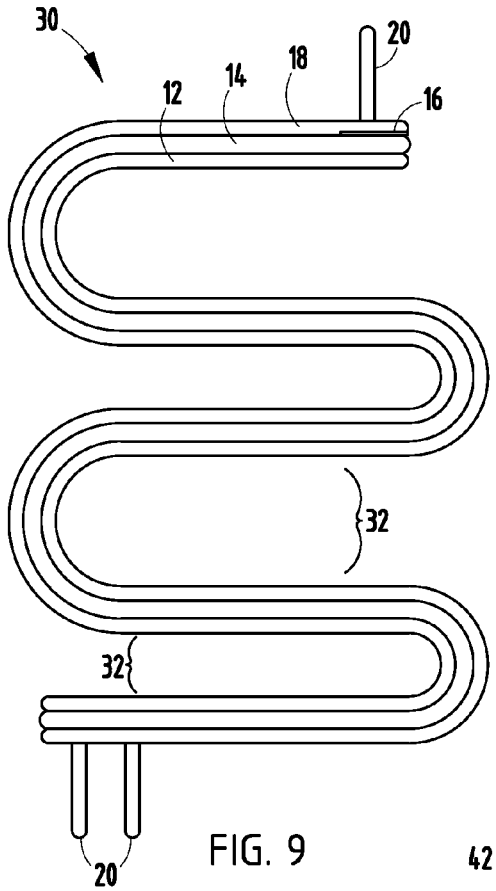
FIG. 9 is a schematic representation of a single layer capacitor shaped or bent into a pseudo-stacked film arrangement.

The completed capacitor of the invention is shapeable or bendable so that it can be configured in a pseudo-stacked film arrangement 30, such as shown in FIG. 9. In this arrangement, gaps 32 between the stacked film layers allow venting of evaporated electrode material in the event of a benign failure.

Figure 10:
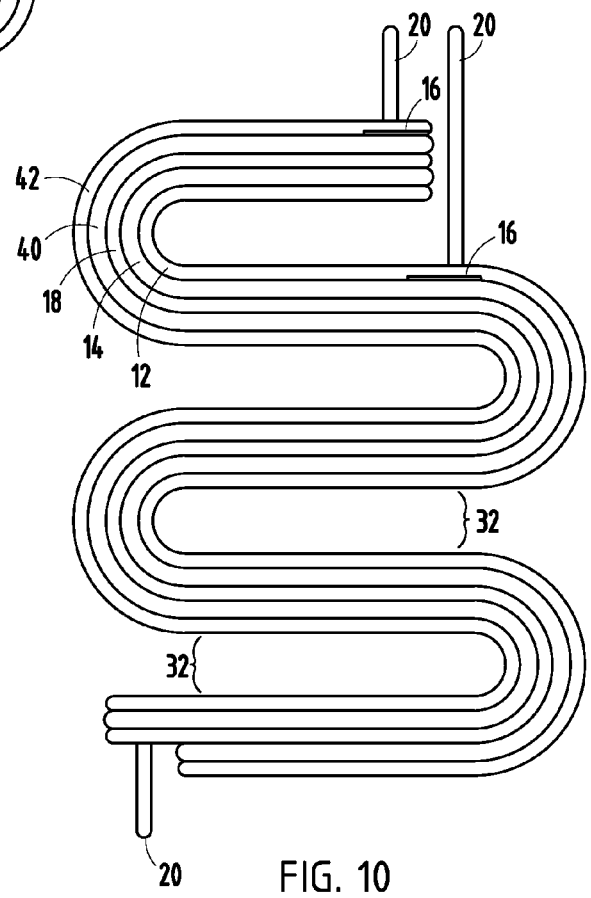
FIG. 10 is a schematic illustration of a double layer capacitor bent or shaped into a pseudo-stacked film arrangement.

FIG. 10 shows a double layer capacitor that is subsequently bent into a pseudo-stacked film arrangement to provide a higher energy storage capacity per unit volume than the single layer capacitor shown in FIG. 9, while still allowing venting of evaporated electrode material in the event of benign failure. The gaps 32 between adjacent stacked film layers for the embodiments shown in FIGS. 9 and 10 will depend on the radius of curvature through which the capacitor can be bent.

However, it is expected that suitable gaps that may be achieved will be in the range of hundreds of micrometers to about one or two millimeters. After the capacitor layers 12, 14 and 18 have been prepared as described above, similar techniques may be employed to add a second dielectric layer 40 and a third metal layer 42 before separating the assembly from substrate 10.

Figure 11:
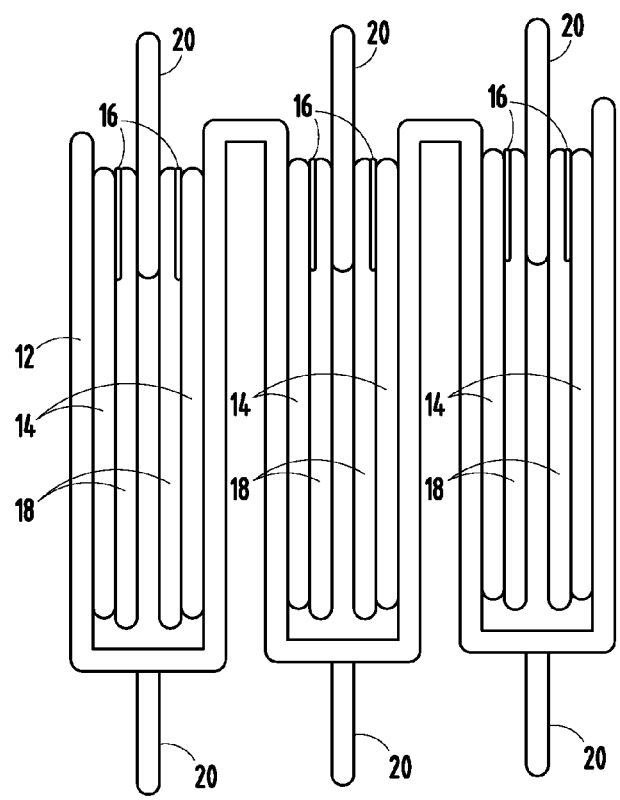
FIG. 11 is a schematic illustration of an alternative embodiment of a single layer capacitor that has been bent or shaped into a pseudo-stacked film arrangement.

FIG. 11 shows another alternative embodiment, in which the ceramic layer and the second metal layer are selectively deposited on a first metal layer by limiting the ceramic dielectric material 14 and the second metal layer 18 to areas between the bends, a smaller radius of curvature may be achieved at the bends, thus providing a more compact arrangement with a higher energy capacity per unit volume.

Figure 12:
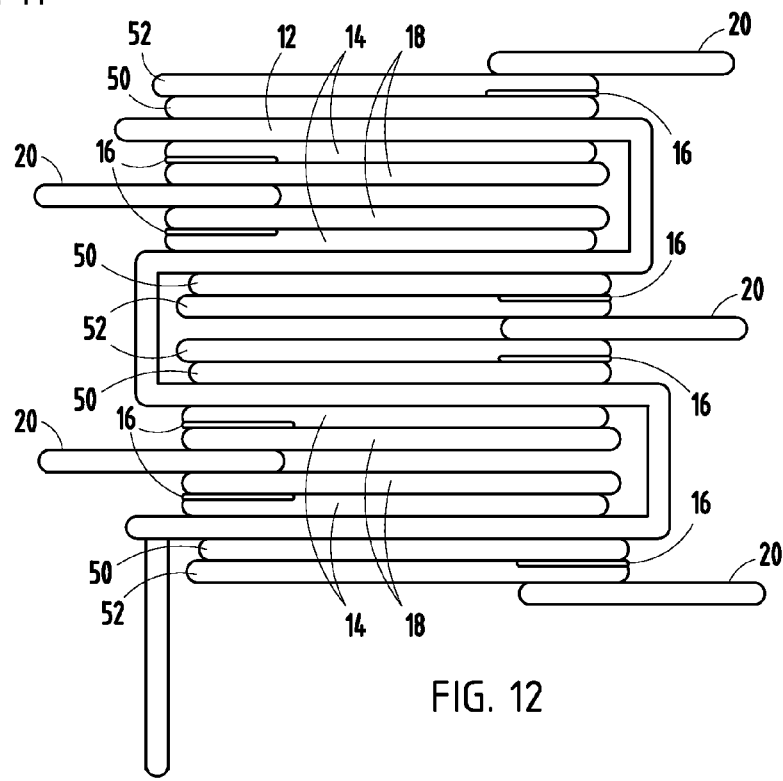
FIG. 12 is a schematic illustration of an alternative embodiment of a double layer capacitor that has been bent or shaped into a pseudo-stacked film arrangement.

FIG. 12 shows a slightly more complex arrangement in which a double layer capacitor having selectively deposited ceramic layers and second metal electrode layers to further improve compactness and energy capacity per unit volume. This arrangement may be achieved by forming layers 12, 14 and 18 as generally described above, separating the resulting assembly from substrate 10, remounting the resulting assembly on a substrate 10 with the side of layer 12 originally deposited on a substrate 10 facing away from the substrate to receive additional dielectric layer 50 and third metal layer 52.

Other possible configurations include spiral wound capacitors.

The various embodiments shown in FIGS. 9, 10, 11 and 12 may be incorporated or embedded into a circuit board design to provide a circuit board with integral capacitors.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

We claim:

1. A shapeable, short-resistant capacitor, comprising:
a first metal electrode having a thickness that is less than about 0.3 microns;
a second metal electrode having a thickness that is less than about 0.3 microns; and
a ceramic dielectric layer disposed between the first metal electrode and the second metal electrode, wherein a stack comprising the first metal electrode, the second metal electrode, and the ceramic dielectric layer is formed in a serpentine arrangement with gaps defined between opposing parallel portions of the first metal electrode and between opposing parallel portions of the second metal electrode, wherein said gaps allow venting of evaporated electrode material in the event of a benign failure.

2. The capacitor of claim 1, wherein the first metal electrode is formed of a material selected from the group consisting of nickel, aluminum, copper, zinc, silver, gold, platinum, titanium, chrome and tungsten.

3. The capacitor of claim 2, wherein the first metal electrode has a thickness of about 0.1 micrometers to 1 micrometers.

4. The capacitor of claim 1, wherein the second metal electrode is formed of a material selected from aluminium, platinum, copper, zinc, silver, gold and combinations of these metals.

5. The capacitor of claim 4, wherein the second metal electrode has a thickness of about 0.01 micrometers to about 0.1 micrometers.

6. The capacitor of claim 1, wherein the ceramic dielectric layer is formed of lead lanthanum zirconium titanate (PLZT).

7. The capacitor of claim 6, wherein the ceramic dielectric layer has a thickness of about 0.1 micrometers to about 4 micrometers.

* * * * *